(12) United States Patent
Shin et al.

(10) Patent No.: US 7,174,104 B2
(45) Date of Patent: Feb. 6, 2007

(54) TRANSMITTING APPARATUS USING MULTIPLE LAMBDA SOURCE IN WDM NETWORK

(75) Inventors: Hong-Seok Shin, Suwon-shi (KR); Seong-Taek Hwang, Pyongtaek-shi (KR); Yun-Je Oh, Yongin-shi (KR)

(73) Assignee: Samsung Electronics Co, Ltd, Suwon-Si (KR)

( * ) Notice: Subject to any disclaimer, the term of this patent is extended or adjusted under 35 U.S.C. 154(b) by 767 days.

(21) Appl. No.: 10/459,796

(22) Filed: Jun. 12, 2003

(65) Prior Publication Data

US 2004/0120715 A1    Jun. 24, 2004

(30) Foreign Application Priority Data

Dec. 20, 2002    (KR) ............... 10-2002-0081694

(51) Int. Cl.
*H04J 14/02* (2006.01)
*H04J 14/00* (2006.01)

(52) U.S. Cl. .................... 398/91; 398/48; 398/50
(58) Field of Classification Search .......... 398/43–103, 398/182, 201
See application file for complete search history.

(56) References Cited

U.S. PATENT DOCUMENTS 5,815,295 A * 9/1998 Darcie et al. ................. 398/72
6,690,848 B2 * 2/2004 Graves et al. ................ 385/16

FOREIGN PATENT DOCUMENTS

JP    2001-197006    7/2001
JP    2001-230757    8/2001

\* cited by examiner

*Primary Examiner*—Kenneth Vanderpuye
*Assistant Examiner*—David Lee
(74) *Attorney, Agent, or Firm*—Cha & Reiter, LLC

(57) ABSTRACT

A transmitting apparatus using a multiple lambda source in WDM network, which has an improved structure to minimize costs and efforts and reduce time delay that may be incurred through wavelength shift. The transmitting apparatus comprises: a multiple lambda source providing a signal with multiple wavelengths, which carries no information; a first optical circulator for transferring the signal with multiple wavelengths carrying no information, which has been transmitted from the multiple lambda sources, to multiplexer/demultiplexer, the first optical circulator transferring a multiplexed signal from the multiplexer/demultiplexer. The multiplexer/demultiplexer demultiplexes the multiple wavelength optical signal from the first optical circulator and for multiplexing optical signals of each wavelength on which information is loaded. An optical space switch for line-distributing demultiplexed signals from the multiplexer/demultiplexer to a channelization module according to each wavelength of the demultiplexed signals, and for transferring optical signals from the channelization module to the multiplexer/demultiplexer; and the channelization module for modulating line distributed optical signals from the optical space switch to generate modulated optical signals, and for transferring the modulated optical signals to the optical space switch.

18 Claims, 5 Drawing Sheets

TRANSMITTING APPARATUS USING MULTIPLE LAMBDA SOURCE IN WDM NETWORK

CLAIM OF PRIORITY

This application claims priority to an application entitled "Transmitting apparatus using multiple lambda source in a WDM network," filed in the Korean Intellectual Property Office on Dec. 20, 2002 and assigned Serial No. 2002-81694, the contents of which are hereby incorporated by reference.

BACKGROUND OF THE INVENTION

1. Field of the Invention

The present invention relates to a transmitting apparatus using a multiple lambda source in a Wavelength Division multiplexing (WDM) network. More particularly, the present invention relates to a transmitting apparatus using a multiple lambda source in a WDM network. The multiple lambda source has an improved structure enhancing the performance of the transmitting apparatus, and has the potential of unify standards of subsystems.

2. Description of the Related Art

In the field of very high-speed optical communication, Wavelength Division multiplexing (WDM) that utilizes a plurality of optical channels is employed in transmitting large quantities of data through a single optical fiber. It is expected that in future, optical communication networks will evolve from the current linear or ring networks in which data are transmitted through fixed lines into an all-optical transmission network in which optical paths can be changed according to necessities so as to dynamically reconstruct the network. Particularly, it is expected that mesh type networks, which are based on Optical Cross-Connectors (OXCs) capable of restructuring a circuit at each node, will become backbone networks.

Optical Cross-Connectors (OXCs) may be implemented by an electrical method or an optical method. In the electrical method, an inputted optical signal is converted into an electrical signal by means of a light/electricity conversion, and the electrical signal is again converted into the optical signal after switching. In the optical method, a wavelength multiplexed optical signal inputted from an input link is demultiplexed and then switched according to the wavelength by a space switch.

Typical OXCs according to the conventional optical method may be classified into OXCs employing a transmitting apparatus using a wavelength converter and OXCs employing a transmitting apparatus using a tunable wavelength light source. The present invention pays attention to only a transmitting apparatus of an OXC other than the other portion of the OXC which receive an electrical signal. Therefore, the following description will center on the transmitting apparatus.

FIG. 1 shows a conventional transmitting apparatus utilizing a wavelength converter in a WDM network of the prior art.

The transmitting apparatus shown in FIG. 1 includes n direct modulated laser diodes 11-1 through 11-n, an optical space switch 12 for performing a line distribution by changing the state of connection of optical signals from the n direct modulated laser diodes 11-1 through 11-n, n wavelength converters 13-1 through 13-n for changing the optical signals having been line-distributed by the optical space switch 12 into signals having wavelengths that may be used by a multiplexer 15, n laser diodes 14-1 through 14-n for providing tuned wavelengths that are needed for wavelength conversion in the n wavelength converters 13-1 through 13-n, and a multiplexer 15 for multiplexing the transport signal channels which are inputted from the n wavelength converters 13-1 through 13-n.

The transmitting apparatus described above generates optical signals using the n direct modulated laser diodes 11-1 through 11-n. The optical signals are provided to destined channel ports of the multiplexer 15 by the optical space switch 12. In this case, the n wavelength converters 13-1 through 13-n are used in converting the wavelengths of the n direct modulated laser diodes 11-1 through 11-n into wavelengths matching the ports of the multiplexer 15 in order to prevent a wavelength contention.

However, because this transmitting apparatus needs a wavelength converter for each channel and a laser diode for providing tuned wavelengths required in wavelength conversion for the operation of each wavelength converter, such a transmitting apparatus is very expensive. Further, because too many components are necessary for constructing this transmitting apparatus, the design is very complicated.

FIG. 2 shows a transmitting apparatus utilizing tunable laser sources for use in a WDM network of the prior art.

The transmitting apparatus depicted in FIG. 2 includes n tunable laser sources 21-1 through 21-n, n modulators 22-1 through 22-n for modulating optical signals from the n tunable laser sources 21-1 through 21-n, an optical space switch 23 for performing a line distribution by changing the state of connection of modulated signals from the n modulators 22-1 through 22-n, and a multiplexer 24 for multiplexing transmitting signal channels which are line distributed by the optical space switch 23.

In this transmitting apparatus, because the tunable laser sources receive information about the state of the optical space switch and convert the wavelengths to wavelengths matching the ports of the multiplexer, such a wavelength converter as depicted in FIG. 1 is not required.

However, the tunable laser source has several drawbacks, including the fact that it is very expensive and has a relatively low response speed. Further, the delay time of the tunable laser source is added to the switching time, thereby further increasing the response time of the tunable laser source. Accordingly, the tunable laser source is not suitable for a transmitting part of an optical cross-connector which requires a high speed of conversion.

SUMMARY OF THE INVENTION

Accordingly, the present invention has been made to solve the above-mentioned problems of the prior art devices. It is also an object of the present invention is to provide a transmitting apparatus using a multiple lambda source in WDM network having an improved structure to minimize costs and efforts and reduce time delay that may be incurred through wavelength shift by reducing some of the expensive parts required in prior art systems.

In accordance with one aspect of the present invention, there is provided a transmitting apparatus using a multiple lambda source in a WDM network, the transmitting apparatus comprising: a multiple lambda source for providing a signal with multiple wavelengths, which carries no information; a first optical circulator for transferring the signal with multiple wavelengths carrying no information, which has been transmitted from the multiple lambda source to a multiplexer/demultiplexer, the first optical circulator transfers a multiplexed signal from the multiplexer/demultiplexer; a multiplexer/demultiplexer demultiplexes the multiple wavelength optical signal from the first optical circulator, and for multiplexing optical signals of each wavelength on which information is loaded; an optical space switch for line-distributing demultiplexed signals from the multiplexer/demultiplexer to a channelization module according to each wavelength of the demultiplexed signals, and for transferring optical signals from the channelization module to the multiplexer/demultiplexer; and the channelization module for modulating line distributed optical signals from the optical space switch to generate modulated optical signals, and for transferring the modulated optical signals to the optical space switch.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments according to the present invention will be described with reference to the accompanying drawings. For the purposes of clarity and simplicity a detailed description of known functions and configurations incorporated herein will be omitted as it may make the subject matter of the present invention unclear.

Figure 1:
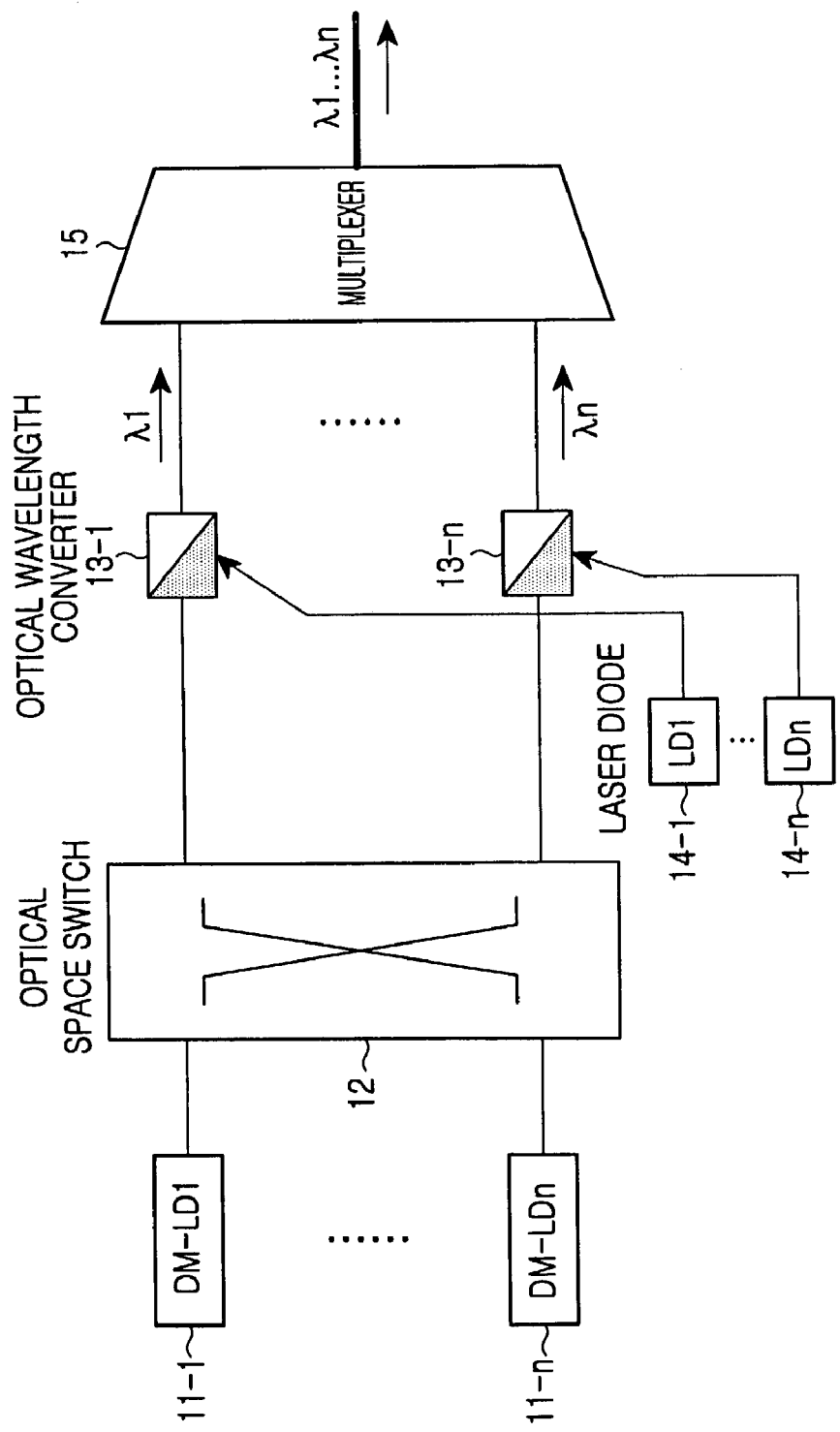
FIG. 1 illustrates a conventional transmitting apparatus using a wavelength converter in a WDM network known in the prior art.
Figure 2:
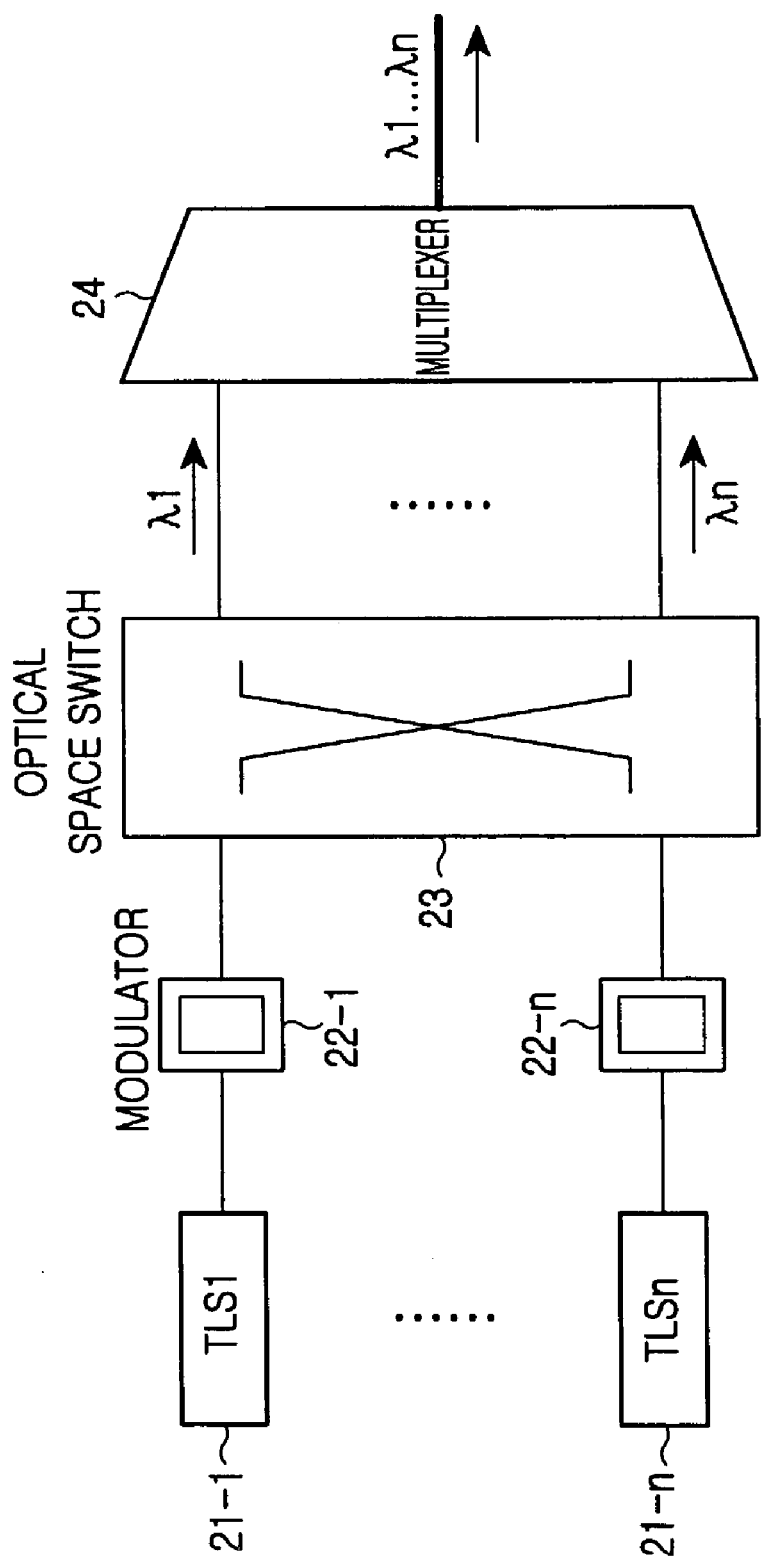
FIG. 2 illustrates a conventional transmitting apparatus using tunable laser sources in a WDM network known in the prior art.
Figure 3:
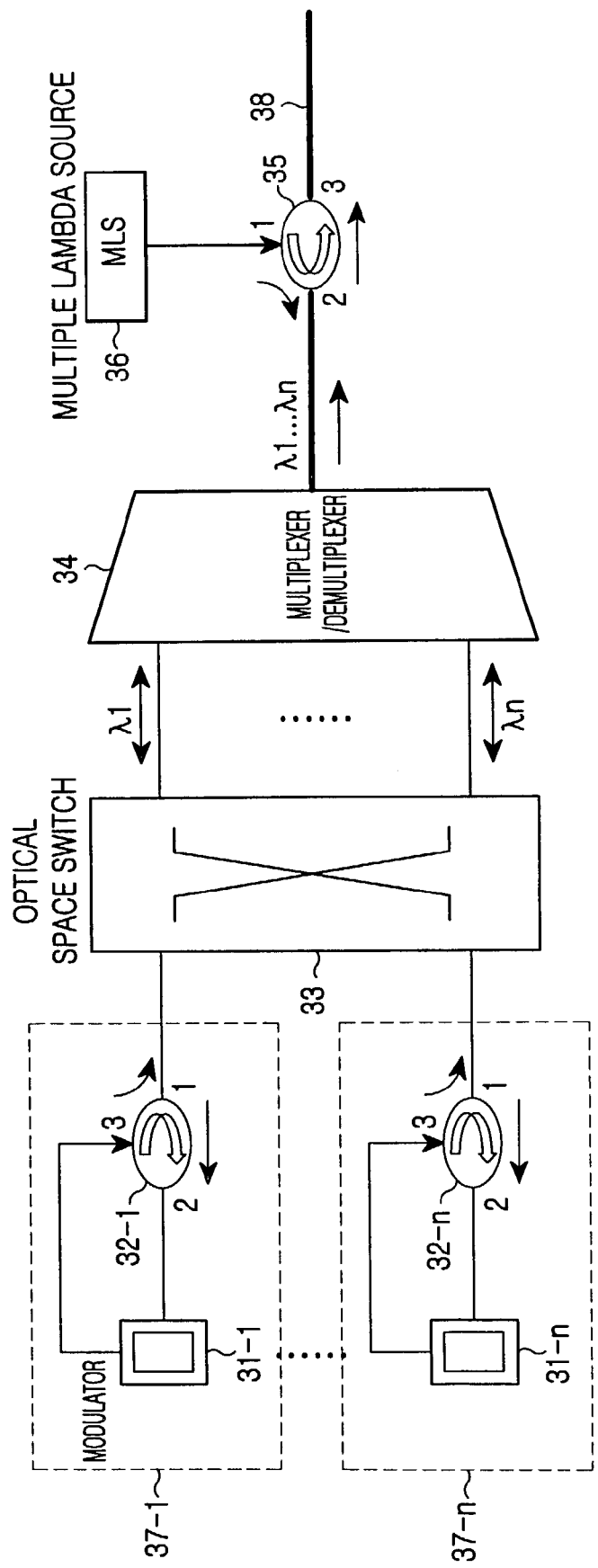
FIG. 3 illustrates a transmitting apparatus using a multiple lambda source in a WDM network in accordance with one embodiment of the present invention.

FIG. 3 shows a transmitting apparatus in accordance with one embodiment of the present invention that uses a multiple lambda source in a WDM network.

As shown in FIG. 3, a transmitting apparatus of a WDM network uses a multiple lambda source 36 introduces a multiple lambda source in tandem with a multiplexer/demultiplexer 34. The transmitting apparatus demultiplexes the multiple lambda source through optical path circulation. The transmitting apparatus modulates each channel by connecting the multiple lambda source through an optical space switch 33 to channel cards according to their wavelengths. Then, the modulated channels pass through the optical space switch and are multiplexed, thereby forming a transmission signal.

To describe the structure of the transmitting apparatus according to the present invention in more detail, the transmitting apparatus includes a multiple lambda source 36, a circulator 35, a multiplexing/demultiplexing apparatus 34, an optical space switch 33, and a plurality of channel cards 37-1 through 37-n. The multiple lambda source 36 provides an optical signal with multiple wavelengths carrying no information. The circulator 35 is connected with the multiple lambda source 36, the multiplexing/demultiplexing apparatus 34, and the transmission cable, and transfers signals between them. The multiplexing/demultiplexing apparatus 34 demultiplexes a signal transferred from the circulator 35 and multiplexes signals transferred from the channel cards 37-1 through 37-n. The optical space switch 33 provides the signal demultiplexed by the multiplexing/demultiplexing apparatus 34 to the channel cards 37-1 through 37-n and provides the signals from the channel cards 37-1 through 37-n to the multiplexing/demultiplexing apparatus 34. The channel cards 37-1 through 37-n modulate the signals inputted through the optical space switch 33 and output the modulated signals.

Further, the circulator 35 transfers the multiple wavelength signal carrying no information from the multiple lambda source 36 to the multiplexing/demultiplexing apparatus 34, and transfers the multiplexed signal provided from the multiplexing/demultiplexing apparatus 34 to the transmission cable 38.

The multiplexing/demultiplexing apparatus 34 demultiplexes the multiple wavelength signal having no information transferred from the circulator 35 and transfers the demultiplexed signals to the optical space switch 33. Then, the multiplexing/demultiplexing apparatus 34 multiplexes signals of each wavelength having information that are transferred through the optical space switch 33 and outputs the multiplexed signal.

One side of the optical space switch 33 is connected with the channel cards 37-1 through 37-n which are formed by combining the modulators 31-1 through 31-n with the channel cards 37-1 through 37-n. The other side of the optical space switch 33 is connected with ports of the multiplexing/demultiplexing apparatus 34. The optical space switch 33 switches the signals demultiplexed by the multiplexing/demultiplexing apparatus 34 to performing line distribution for the signals, so that the signals are provided to the channel cards 37-1 through 37-n according to the wavelengths of the signals. Then, the optical space switch 33 transfers the modulated signals from the channel cards 37-1 through 37-n to the multiplexing/demultiplexing apparatus 34.

Further, the channel cards 37-1 through 37-n modulate the signals having been line-distributed by the optical space switch 33 and transfer the modulated signals back to the optical space switch 33. The channel cards 37-1 through 37-n correspond respectively to ports of the multiplexing/demultiplexing apparatus 34.

In particular, each of the channel cards 37-1 through 37-n includes a circulator 32-1, through 32-n and a modulator 31-1 through 31-n. The circulators 32-1 through 32-n transfer the signals having been line-distributed by the optical space switch 33 respectively to the modulators 31-1 through 31-n and transfer the signals having been modulated by the modulators 31-1 through 31-n to the optical space switch 33.

The signal flow will be described below.

The multiple lambda source 36 in FIG. 3 provides the optical signal with multiple wavelength carrying no information to the multiplexing/demultiplexing apparatus 34 through the circulator 35. The optical signal is demultiplexed by the multiplexing/demultiplexing apparatus 34 to be divided according to wavelengths, and the divided signals are then provided to the optical space switch 33.

The optical space switch 33 changes state of the optical switch according to received information about the transport channel and the wavelength which will be utilized. As a result, the optical signals according to wavelengths, which are outputted respectively from the ports of the multiplexing/demultiplexing apparatus 34, can be provided to the corresponding channel cards 37-1 through 37-n, respectively.

The individual signal with a specific wavelength inputted to each channel is directed toward the modulators 31-1 through 31-n through the circulators 32-1 through 32-n. While the individual signal passes through the modulators 31-1 through 31-n, a signal to be transmitted is loaded on the individual signal transferred from the circulators 32-1 through 32-n.

When the individual signal carrying the information to be transmitted is connected again to the optical space switch 33 (3→1) while crossing another signal with a different wavelength inputted through another ports of the circulators 32-1 through 32-n (1→2), the individual signal carrying the information to be transmitted progresses back to the corresponding port of the multiplexing/demultiplexing apparatus 34 along the path through which the individual signal have already reached the optical space switch 33.

Then, the multiplexing/demultiplexing apparatus 34 multiplexes the signal on which information has been loaded. Then, the signal carrying the information is transferred to the transmission cable (2→3) while crossing another optical signal with multiple wavelengths carrying no information (1→2).

In this case, when the performance of the multiple lambda source comes short of the standard for a transmitting system, lights may be provided using laser diodes (LD) for each wavelength. In this way, a method of using an optical multiplexer is applied according to the comparison result of the prices of optical parts and the performances of the systems.

Figure 4:
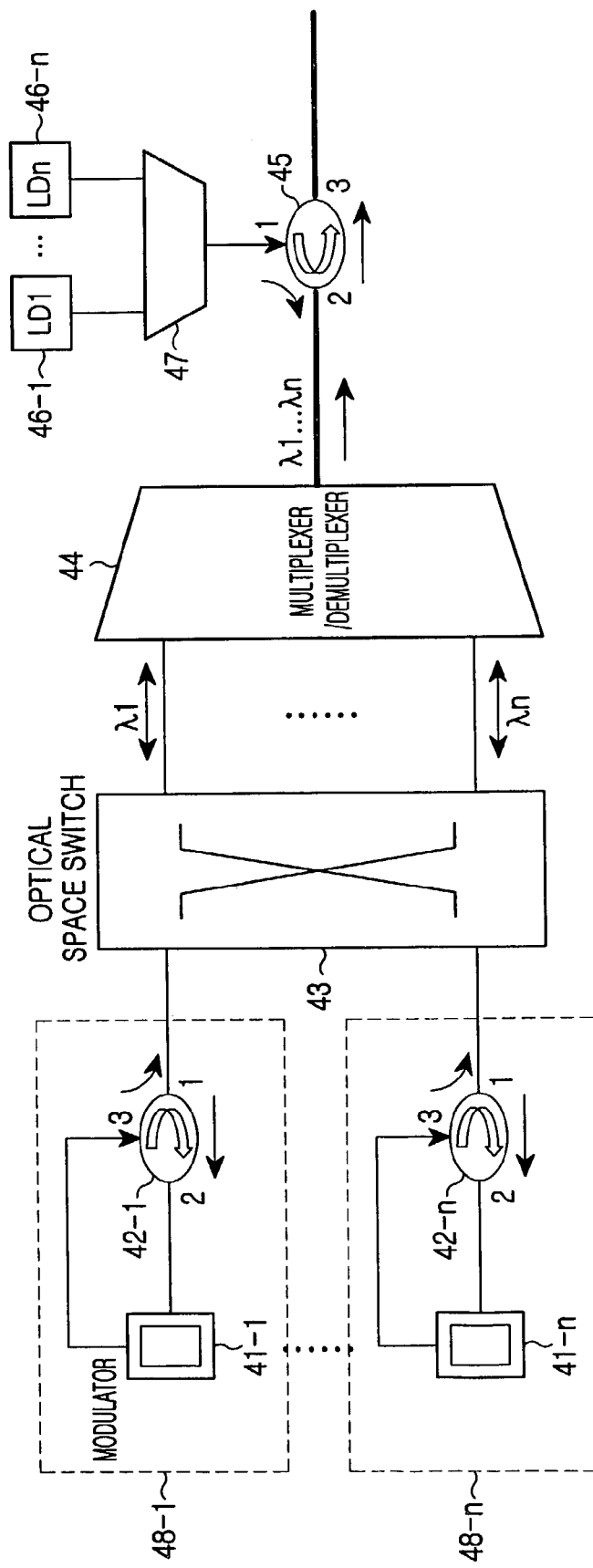
FIG. 4 illustrates a transmitting apparatus using a multiple lambda source made by an optical multiplexer in a WDM network in accordance with another embodiment of the present invention.

FIG. 4 shows a transmitting apparatus in accordance with another embodiment of the present invention that uses a multiple lambda source made by an optical multiplexer in a WDM network.

As shown in FIG. 4, according to the embodiment of the present invention, a multiple lambda source is formed by using the individual wavelength optical sources 46-1 through 46-n, which generate optical signals the wavelengths that are different from one another, and by a lambda source multiplexer 47 which multiplexes the optical signals inputted from the individual wavelength optical sources thereby to form one multiple wavelength light source. Although the multiple lambda source 46 has the same number of individual wavelength optical sources as that of the channels of the multiplexer in the embodiment shown in FIG. 4, the number of individual wavelength optical sources has no effect on forming the multiple lambda source according to the present invention regardless whether the number of individual wavelength optical sources and the number of channels of the multiplexer are different from each other.

Because the structure of the embodiment depicted in FIG. 4 is identical with that depicted in FIG. 3 except for the multiple lambda source, a detailed description of the operations and configurations of the other parts in FIG. 4 is omitted.

Figure 5:
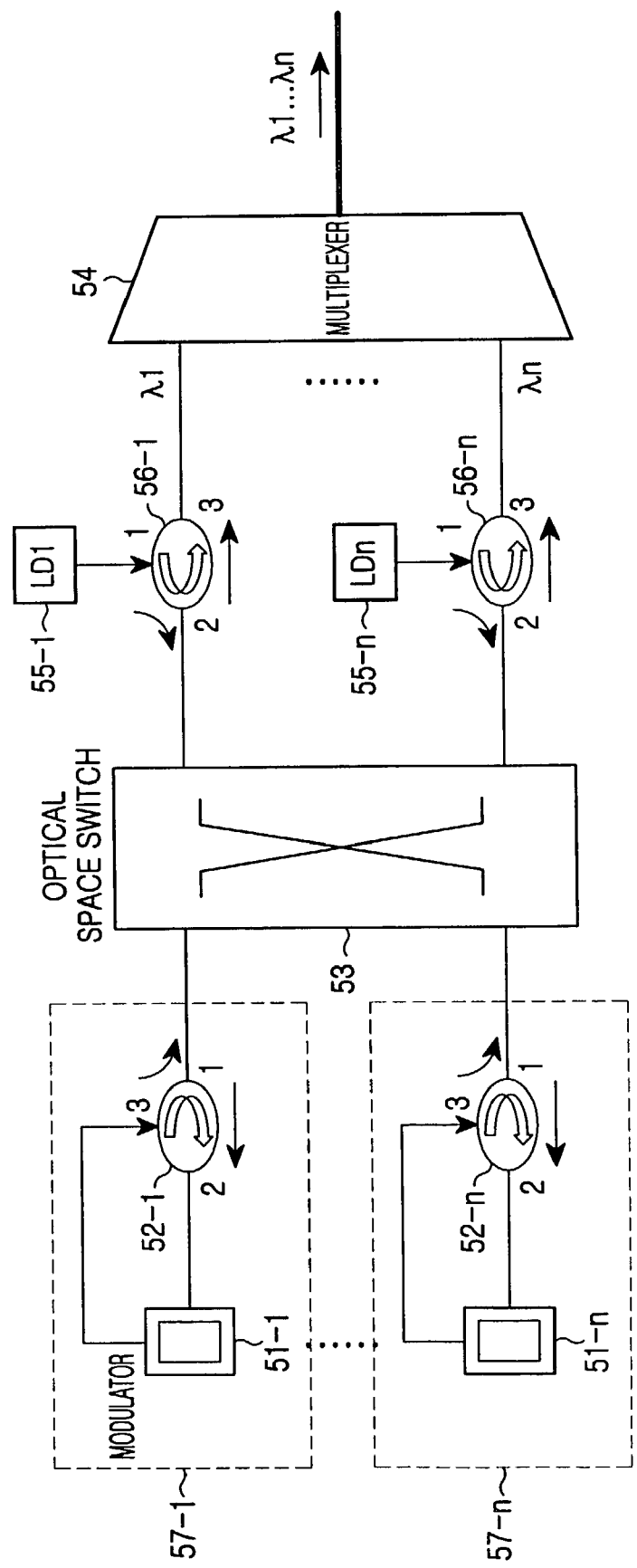
FIG. 5 illustrates a transmitting apparatus using a plurality of individual wavelength light sources in a WDM network in accordance with another embodiment of the present invention.

FIG. 5 shows a transmitting apparatus using a plurality of individual wavelength light sources in a WDM network in accordance with yet another embodiment of the present invention.

The transmitting apparatus depicted in FIG. 5 is different from the apparatus depicted in FIG. 3 and FIG. 4, both of which demultiplex a multiple wavelength optical signal and electro-optically convert the demultiplexed signals to transmit the electro-optic converted signals.

The transmitting apparatus depicted in FIG. 5 shows another way the elements can be arranged.

In the embodiment shown in FIG. 5, the apparatus demultiplexes a plurality of optical signals at a number of wavelengths generated from a plurality of individual wavelength optical sources such as a plurality of laser diodes 55-1 to 55-n connected with respective circulators 56-1 to 56-n, each of which connected with a multiplexer 54, without using a multiple lambda source, then transmits the demultiplexed optical signal to optical space switch 53 and onto modulators 57-1 to 57-n.

However, it may be understood that the basic scheme of the transmitting apparatus depicted in FIG. 5 is the same as those of the apparatus depicted in FIG. 3 and FIG. 4 because the transmitting apparatus of FIG. 5 switches the optical signals generated from each of the individual wavelength optical sources.

According to the present invention, by providing a transmitting apparatus using a multiple lambda source in a WDM network, an optical cross-connector can be implemented without a wavelength converter, so that the cost of individual optical sources needed in a very expensive wavelength converter is reduced. Further, design of a circuit for stabilizing the wavelength and intensity of light can be simplified by reducing the number of devices used for the stabilizing circuit.

Further, the present invention has an effect of reducing time delay, because the wavelength conversion can be performed at a higher speed than that of a tunable wavelength optical source as additional time for the wavelength conversion is not necessary in the transmitting apparatus according to the present invention.

Further, when compared with a very expensive tunable wavelength optical source, an inexpensive multiple lambda source is used in the transmitting apparatus according to the present invention, so that the cost is reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmitting apparatus using a multiple lambda source in a WDM network, the transmitting apparatus comprising:
    a multiple lambda source providing a signal output with multiple wavelengths, the signal output carries no information;
    a first optical circulator connected to the multiple lambda source, the first optical circulator transfers the signal with multiple wavelengths transmitted from the multiple lambda source within said transmitting apparatus
    a multiplexer/demultiplexer connected to the first optical circulator, said multiplexer/demultiplexer receives the transferred signal with multiple wavelengths from the multiple lambda source via the first optical circulator, demultiplexes the multiple wavelength optical signal and multiplexes optical signals of each wavelength on which information is loaded;
    an optical space switch connected with the multiplexer/demultiplexer for line-distributing demultiplexed signals from the multiplexer/demultiplexer to a channelization module according to each wavelength of the demultiplexed signals, and for transferring optical signals from the channelization module to the multiplexer/demultiplexer; and the channelization module includes a modulated line having distributed optical signals from the optical space switch so as to generate modulated optical signals, and for transferring the modulated optical signals to the optical space switch.

2. The apparatus as claimed in claim 1, wherein the channelization module further comprises comprises:
   a second optical circulators for transferring the line-distributed optical signals from the optical space switch to a modulator, and for transferring the modulated optical signals which are modulated by the modulator to the optical space switch; and
   the modulator modulates the line distributed optical signals from the second optical circulator.

3. The apparatus as recited in claim 1, wherein the multiple lambda source further comprises:
   a plurality of individual optical sources for generating optical signals the wavelengths of which are different from one another; and
   a lambda source multiplexer for multiplexing the optical signals from the individual optical sources.

4. The apparatus as recited in claim 2, wherein the multiple lambda source further comprises:
   a plurality of individual optical sources for generating optical signals the wavelengths of which are different from one another; and
   a lambda source multiplexer for multiplexing the optical signals from the individual optical sources.

5. The apparatus as recited in claim 1, wherein the channelization module further comprises a plurality of modulators, each respective modulator having a channel card connected to the optical space switch via a respective second circulator for transferring the line-distributed optical signals from the space switch to a respective modulator.

6. The apparatus as recited in claim 5, wherein each channel card corresponds to a respective port of the multiplexer/demultiplexer.

7. A transmitting apparatus in a WDM network, the transmitting apparatus comprising:
   a plurality of individual laser light sources having different wavelengths;
   a plurality of optical circulators, each one circulator connected to a respective one of the plurality of individual laser light sources;
   a multiplexer/demultiplexer connected to a first output of each of the plurality of optical circulators for providing a signal output with multiple wavelengths;
   each of the plurality of optical circulators having a second output for transferring the individual light signal of the respective one of the plurality of laser light signals of each wavelength on which information is loaded;
   an optical space switch connected to the plurality of optical circulators for line-distributing demultiplexed signals to a channelization module according to each wavelength of the demultiplexed signals, and for transferring optical signals from the channelization module to the multiplexer/demultiplexer; and
   the channelization module includes a modulated line having distributed optical signals from the optical space switch so as to generate modulated optical signals, and for transferring the modulated optical signals to the optical space switch.

8. The apparatus as recited in claim 7, wherein the channelization module further comprises a plurality of modulators, each respective modulator having a channel card connected to the optical space switch via a respective second circulator for transferring the line-distributed optical signals from the space switch to a respective modulator.

9. The apparatus as recited in claim 8, wherein each channel card corresponds to a respective port of the multiplexer/demultiplexer.

10. A method for providing transmitting using a multiple lambda source in a WDM network, the transmitting apparatus comprising:
    (a) providing a multiple lambda source providing a signal output with multiple wavelengths, the signal output carries no information;
    (b) connecting a first optical circulator to the multiple lambda source, the first optical circulator transfers the signal with multiple wavelengths transmitted from the multiple lambda source to a multiplexer/demultiplexer connected to the first optical circulator, said multiplexer/demultiplexer receives the transferred signal with multiple wavelengths from the multiple lambda source via the first optical circulator, demultiplexes the multiple wavelength optical signal and multiplexes optical signals of each wavelength on which information is loaded;
    (c) providing an optical space switch connected with the multiplexer/demultiplexer for line-distributing demultiplexed signals from the multiplexer/demultiplexer to a channelization module according to each wavelength of the demultiplexed signals, and for transferring optical signals from the channelization module to the multiplexer/demultiplexer; and
    (d) providing the channelization module with a modulated line having distributed optical signals from the optical space switch so as to generate modulated optical signals, and for transferring the modulated optical signals to the optical space switch.

11. The method as recited in claim 10, further comprising:
    (e) providing a plurality of second optical circulators for transferring the line-distributed optical signals from the optical space switch to a modulator, and for transferring the modulated optical signals which are modulated by the modulator to the optical space switch;
    wherein the modulator modulates the line distributed optical signals from the second optical circulator.

12. The method as recited in claim 10, wherein the multiple lambda source provided in step (a) includes a plurality of individual optical sources for generating optical signals the wavelengths of which are different from one another; and
    a lambda source multiplexer for multiplexing the optical signals from the individual optical sources.

13. The method as recited in claim 11, wherein the multiple lambda source provided in step (a) includes a plurality of individual optical sources for generating optical signals the wavelengths of which are different from one another; and
    a lambda source multiplexer for multiplexing the optical signals from the individual optical sources.

14. The method as recited in claim 10, wherein the channelization module is provided with a plurality of modulators, each respective modulator having a channel card connected to the optical space switch via a respective second circulator for transferring the line-distributed optical signals from the space switch to a respective modulator.

15. The method as recited in claim 14, wherein each channel card corresponds to a respective port of the multiplexer/demultiplexer.

16. A method for transmitting in a WDM network, the transmitting apparatus comprising:

(a) providing a plurality of individual laser light sources having different wavelengths;
(b) providing a plurality of optical circulators, each one circulator being connected to a respective one of the plurality of individual laser light sources;
(c) providing a multiplexer/demultiplexer connected to a first output of each of the plurality of optical circulators for providing a signal output with multiple wavelengths, and wherein each of the plurality of optical circulators having a second output for transfering the individual light signal of the respective one of the plurality of laser light signals of each wavelength on which information is loaded;
(d) connecting an optical space switch to the plurality of optical circulators for line-distributing demultiplexed signals to a channelization module according to each wavelength of the demultiplexed signals, and for transferring optical signals from the channelization module to the multiplexer/demultiplexer, wherein the channelization module includes a modulated line having distributed optical signals from the optical space switch so as to generate modulated optical signals, and for transferring the modulated optical signals to the optical space switch.

17. The method as recited in claim 16, wherein the channelization module provided further comprises a plurality of modulators, each respective modulator having a channel card connected to the optical space switch via a respective second circulator for transferring the line-distributed optical signals from the space switch to a respective modulator.

18. The method as recited in claim 17, wherein each channel card corresponds to a respective port of the multiplexer/demultiplexer.

* * * * *